United States Patent
Kim et al.

(10) Patent No.: US 9,904,426 B2
(45) Date of Patent: Feb. 27, 2018

(54) CAPACITIVE TYPE TOUCH INPUT DEVICE WITH COMPENSATION CIRCUIT FOR STRAY CAPACITANCE

(71) Applicant: ZINITIX CO., LTD., Gyeonggi-do (KR)

(72) Inventors: Bok-Man Kim, Seoul (KR); Byeong Checl So, Gyeonggi-do (KR); Seon Woong Jang, Seoul (KR); Kwang Soo Kim, Gyeonggi-do (KR)

(73) Assignee: ZINITIX CO., LTD., Gyeonggi-Do (KR)

( * ) Notice: Subject to any disclaimer, the term of this patent is extended or adjusted under 35 U.S.C. 154(b) by 48 days.

(21) Appl. No.: 14/983,636

(22) Filed: Dec. 30, 2015

(65) Prior Publication Data

US 2017/0192551 A1      Jul. 6, 2017

(51) Int. Cl.
*G06F 3/044*      (2006.01)
*G06F 3/041*      (2006.01)

(52) U.S. Cl.
CPC ............ *G06F 3/044* (2013.01); *G06F 3/0418* (2013.01)

(58) Field of Classification Search
CPC ....... G06F 3/044; G06F 3/0416; G06F 3/0418
See application file for complete search history.

(56) References Cited

U.S. PATENT DOCUMENTS

| | | | | |
|---|---|---|---|---|
| 7,825,832 B2* | 11/2010 | Nishimura | .......... | G06F 3/03547 341/5 |
| 8,487,639 B1* | 7/2013 | Walsh | ..................... | G06F 3/044 324/658 |
| 8,614,587 B1* | 12/2013 | Ogirko | .................... | G06F 3/044 324/678 |
| 9,019,220 B1* | 4/2015 | Klein | ...................... | G06F 3/044 345/173 |
| 2011/0273400 A1* | 11/2011 | Kwon | ................... | G06F 3/0416 345/174 |
| 2013/0021291 A1* | 1/2013 | Kremin | ................. | G06F 3/0416 345/174 |
| 2016/0098117 A1* | 4/2016 | Ouh | ...................... | G06F 3/0418 345/174 |
| 2016/0148034 A1* | 5/2016 | Kremin | ................ | G06K 9/0002 382/124 |
| 2016/0357299 A1* | 12/2016 | Liu | .......................... | G06F 3/044 |
| 2017/0061188 A1* | 3/2017 | Kremin | ................... | G06F 3/044 |

FOREIGN PATENT DOCUMENTS

| | | |
|---|---|---|
| JP | 2007-179230 | 7/2007 |
| KR | 1020130141045 | 12/2013 |
| KR | 1020140030170 | 3/2014 |

* cited by examiner

*Primary Examiner* — Darlene M Ritchie
(74) *Attorney, Agent, or Firm* — Stuart H. Mayer; Mayer & Williams PC (57) ABSTRACT

Provided is a touch chip including a touch input detector and a compensator, wherein an input terminal of the touch input detector and an output terminal of the compensator are together connected to a touch input sensing electrode, and a direction change of a first current flowing through the input terminal of the touch input detector and a direction change of a second current flowing through the output terminal of the compensator are performed through synchronization.

7 Claims, 9 Drawing Sheets

CAPACITIVE TYPE TOUCH INPUT DEVICE WITH COMPENSATION CIRCUIT FOR STRAY CAPACITANCE

BACKGROUND

The present disclosure relates to a capacitive type touch input device for a user input, and more particularly, to a technology to have a structure for adjusting sensitivity to a touch input.

When there is an object, such as a human being's finger, near a conductor (=electrode), capacitive capacitance is formed between the conductor and the finger. The capacitive capacitance may provide a current path between the conductor and the finger. The size of the capacitive capacitance may vary according to the distance between the conductor and the finger.

The capacitive type touch input device is a device that uses the above-described principle to dispose a plurality of conductors on the surface of a touch panel in the touch input device, and detect that the size of a current flowing through a specific conductor varies when there is a finger near the specific conductor, in order to detect whether a touch input has been applied. Thus, the capacitive type touch input device may include a touch input detector (=touch input detection circuit unit, touch input detection part) for measuring the size of the current. The capacitive type touch input device may function as a component of a user device, such as a smart phone.

When it is assumed that a touch input is not applied to a target conductor to be determined on whether a touch input is not applied thereto, the target conductor may have certain reference capacitance. The reference capacitance may be mutual capacitance that is formed between the target conductor and another conductor, and stray capacitance that is formed between the target conductor and other circuit devices. In this case, the mutual capacitance may be intentionally formed according to design intention and the stray capacitance may be a capacitance component that occurs unintentionally. When a finger is in contact with the target conductor, the capacitance of the target conductor may have a changed capacitance value that is different from the reference capacitance. In this case, it is possible to determine the sensitivity of a touch input detector according to the ratio of a variation in capacitance that occurs due to contact and the reference capacitance. If the size of the reference capacitance is too large, it may be difficult to detect whether the capacitance formed at the target conductor varies by a touch input. Thus, the reference capacitance needs to have an appropriate value.

However, since as described above, the reference capacitance may include unintended stray capacitance, there is a limitation in that the reference capacitance may be larger than design intention.

Also, in a capacitive type touch input device in which a plurality of conductors is disposed, uncontrollable mutual capacitance may also be formed between the plurality of conductors. From the point of the touch input detector, the uncontrollable mutual capacitance may configure the above-described stray capacitance.

SUMMARY

The present disclosure provides a technology to compensate for when a reference capacitance value for calculating a variation in capacitance varying by a touch input when the touch input is applied to the electrode disposed on a touch panel is different from design intention.

Especially, the present disclosure provides a technology to adjust an equivalent capacitance value related to the electrode viewed from the input of the touch input detector in a state in which the electrode is connected to the touch input detector for measuring the capacitance value formed at the electrode.

The smaller a capacitance value formed at a touch input detection electrode viewed from the input of a touch input detector is, the larger a variation in capacitance according to a touch input is, so it is possible to enhance the sensitivity of the touch input detector.

To solve the above-described tasks, a compensator (compensation circuit, compensation part) may be connected to the input of the touch input detector according to an aspect of the present disclosure. In this case, currents flowing through the touch input detection electrode may be divided into the touch input detector and the compensator. Thus, the value of a first current input to and output from the touch input detector when there is the compensator may be smaller than that of a second current input to and output from the touch input detector when there is no compensator.

In this case, the capacitance formed at the touch input detection electrode viewed from the touch input detector may be proportional to a value obtained by the integral of currents input to the touch input detector. The reason is that the currents input to the touch input detector are formed by charges that are stored by capacitance formed at the touch input detection electrode. Thus, the first capacitance formed at the touch input detection electrode viewed from the touch input detector when there is the compensator may be smaller than the second capacitance formed at the touch input detection electrode viewed from the touch input detector when there is no compensator.

In the circuit provided in accordance with an aspect of the present disclosure, it is possible to use the above-described compensator to make smaller the equivalent value of the capacitance formed at the touch input detection electrode viewed from the input of the touch input detector.

On the contrary, in the circuit provided in accordance with an aspect of the present disclosure, it is possible to use the above-described compensator to make larger the equivalent value of the capacitance formed at the touch input detection electrode viewed from the input of the touch input detector.

The touch chip provided in accordance with an aspect of the present disclosure includes a touch input detector; and a compensator. In this case, an input terminal of the touch input detector and an output terminal of the compensator are together connected to a touch input sensing electrode, and the direction change of a first current flowing through the input terminal of the touch input detector and the direction change of a second current flowing through the output terminal of the compensator are performed through synchronization.

The touch input device provided in accordance with another aspect of the present disclosure includes a touch input sensing electrode; one or more second electrodes forming mutual capacitance with the touch input sensing electrode; a touch input detector; and a compensator. In addition, an input terminal of the touch input detector and an output terminal of the compensator are together connected to the touch input sensing electrode, and the direction change of a first current flowing through the input terminal of the touch input detector and the direction change of a second current flowing through the output terminal of the compensator are performed through synchronization.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

In the following, embodiments of the present disclosure are described with reference to the accompanying drawings. However, the present disclosure is not limited to the embodiments described in the specification and may be implemented in other forms. The terms used herein are to help the understanding of the embodiments and are not intended to define the scope of the present disclosure. Also, singular forms used below also include plural forms unless stated to the contrary.

Figure 1A:
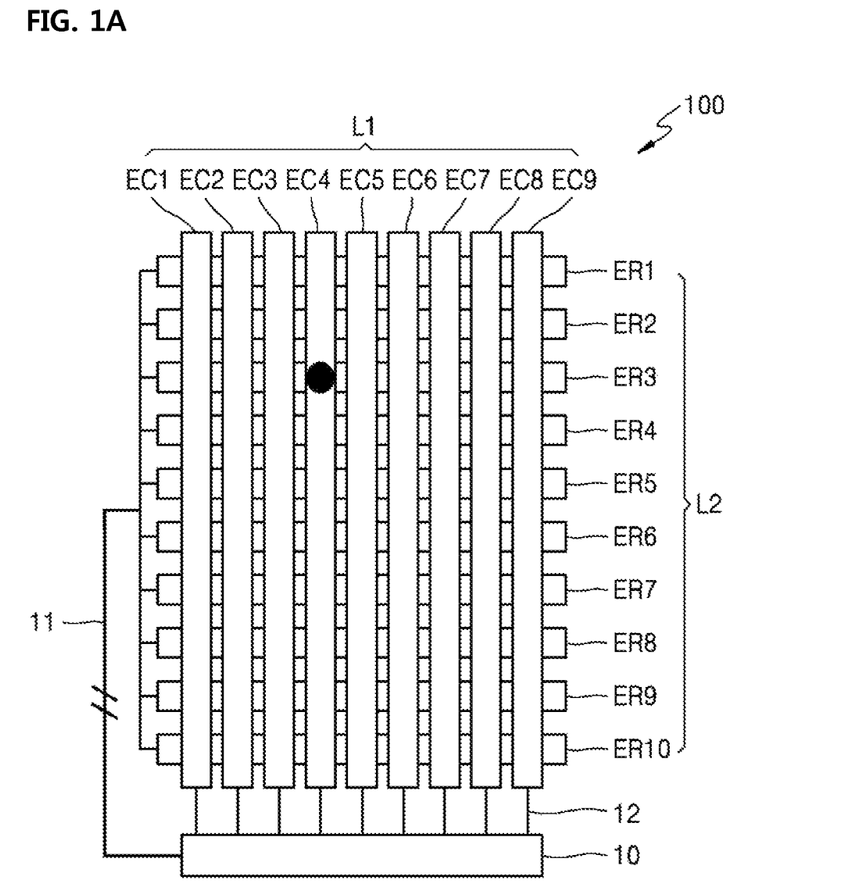
FIGS. 1A and 1B represent an example of an arrangement of electrodes that are disposed in a touch panel in accordance with an embodiment of the present disclosure.
Figure 1B:
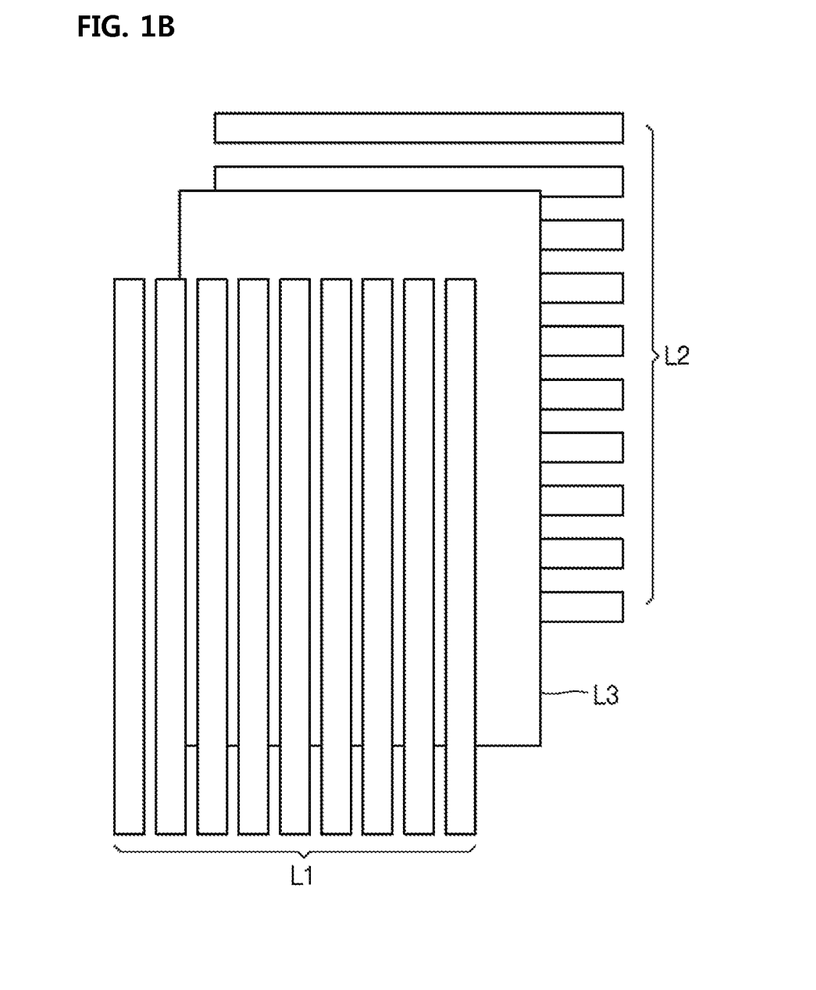

FIGS. 1A and 1B represent an example of an arrangement of electrodes that are disposed in a touch panel in accordance with an embodiment of the present disclosure.

FIG. 1A represents the mutual connection between components in a touch input device 100 in accordance with an embodiment of the present disclosure. The touch input device 100 may include first electrodes EC1 to EC9 arranged on a first layer L1, second electrodes ER1 to ER10 arranged on a second layer L2, and a touch chip 10 that is connected to the first electrodes EC1 to EC9 and the second electrodes ER1 to ER10. The touch chip 10 may be connected to the second electrodes ER1 to ER10 through a first wire 11 and to the first electrodes EC1 to EC9 through a second wire 12. Each of the electrodes EC1 to EC9 and ER1 to ER10 is insulated from all other electrodes.

FIG. 1B represents the relative arrangement of the first electrodes EC1 to EC9 and the second electrodes ER1 to ER10, especially. The first electrodes EC1 to EC9 are arranged on the first layer L1, the second electrodes ER1 to ER10 are arranged on the second layer L2, and a dielectric layer L3 is disposed between the first layer L1 and the second layer L2 to insulate the first electrodes EC1 to EC9 from the second electrodes ER1 to ER10.

An operation principle in accordance with the first mode of the touch input device 100 in FIG. 1 may be described through the following example. For the purpose of description, it is assumed below that a touch input has been applied to a region where the electrode EC4 and the electrode ER3 intersect.

Firstly, the touch chip 10 sequentially detects whether there is a variation in capacitance for each of the electrodes EC1 to EC9. In this case, since a touch input is not applied to electrodes EC1 to EC3 and EC5 to EC9, the electrodes EC1 to EC3 and EC5 to EC9 have no variation in capacitance. However, since the touch input has been applied to the electrode EC4, a variation in capacitance for the electrode EC4 may be sensed. Thus, the touch chip 10 may determine that the touch input has been applied to any of regions where the electrode EC4 occupied.

Next, the touch chip 10 sequentially detects whether there is a variation in capacitance for each of the electrodes ER1 to ER10. In this case, since a touch input is not applied to electrodes EC1 to EC3 and EC5 to EC9, there is no variation in capacitance for the electrodes EC1 to EC3 and EC5 to EC9. However, since the touch input has been applied to the electrode ER3, a variation in capacitance for the electrode ER3 may be sensed.

Thus, since only the electrodes EC4 and ER3 sense variations in capacitance, the touch chip 10 may determine that the touch input has been applied to the intersection of the electrodes EC4 and ER3.

Even when touch inputs simultaneously occur at many points on the touch panel, it is possible to identify each touch point in the same principle as above.

Figure 2A:
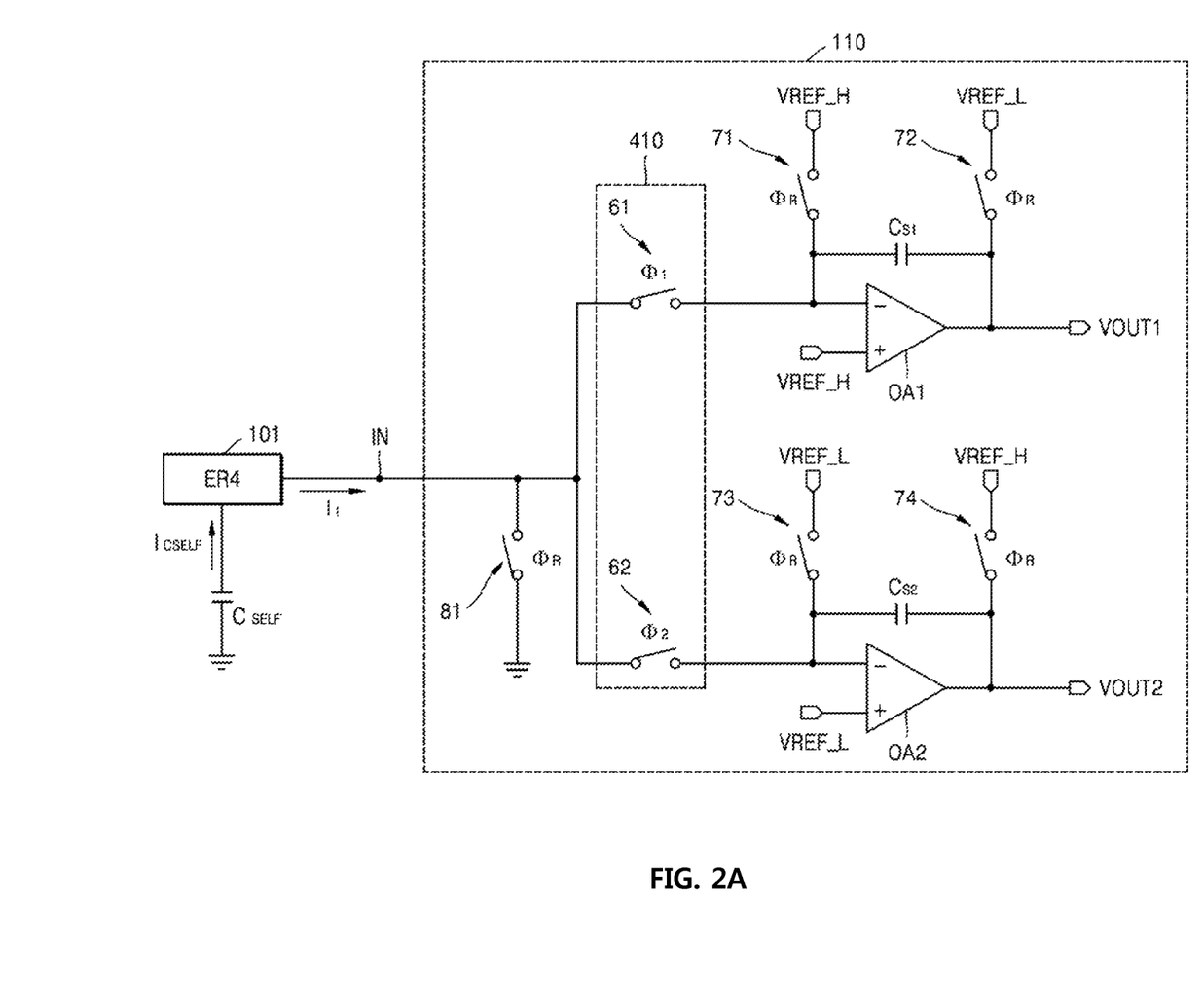
FIG. 2A represents the structure of a touch input detector that measures currents flowing through electrodes that are arranged in a touch panel in accordance with an embodiment of the present disclosure.

FIG. 2A represents the structure of a touch input detector that measures currents flowing through electrodes that are arranged in a touch panel in accordance with an embodiment of the present disclosure.

The touch input detector 110 in FIG. 2A may be disposed in plurality in the touch chip 10.

The touch input detector 110 may include an input terminal IN as an input terminal and includes a first output terminal VOUT1 and a second output terminal VOUT2 as output terminals.

It is possible to provide the relative voltage difference between the first output terminal VOUT1 and the second output terminal VOUT2 as an output signal from the touch input detector 110. In addition, the input terminal IN may be connected to any one of the electrodes EC1 to EC9 and ER1 to ER10 and may also be connected to a reference voltage by means of a switch 81.

The touch input detector 110 may include a first operational amplifier OA1 and a second operational amplifier OA2.

A first reference voltage VREF_H may be applied to the non-inverting input terminal of the first operational amplifier OA1 and a second reference voltage VREF_may be applied to the non-inverting input terminal of the second operational amplifier OA2.

The inverting input terminal of the first operational amplifier OA1 may be connected to the input terminal IN through a switch 61 and to the first reference voltage VREF_H through a switch 71. The inverting input terminal of the second operational amplifier OA2 may be connected to the input terminal IN through a switch 62 and to the second reference voltage VREF_through a switch 73.

The output terminal of the first operational amplifier OA1 may be provided as the first output terminal VOUT1 and may be connected to the second reference voltage VREF_through a switch 72. The output terminal of the second operational amplifier OA2 may be provided as the second output terminal VOUT2 and may be connected to the first reference voltage VREF_H through a switch 74.

The output terminal and inverting input terminal of the first operational amplifier OA1 may be connected each other by means of a first integrator capacitor $C_{S1}$. The output terminal and inverting input terminal of the second operational amplifier OA2 may be connected each other by means of a second integrator capacitor $C_{S2}$.

A touch detection electrode 101 in FIG. 2A represents e.g., any one of the electrodes EC1 to EC9 and ER1 to ER10 in FIG. 1 and FIG. 2A represents the electrode ER4 as an example. In addition, capacitance $C_{SELF}$ represents, through modeling, a sum of 'sensing capacitance' formed between the touch detection electrode 101 and a human being's finger and stray capacitance formed between the touch detection electrode 101 and any part of a user device. If there is no human being's finger near the touch detection electrode 101, the value of the 'sensing capacitance' may be close to zero and the value of the capacitance $C_{SELF}$ may be close to the stray capacitance.

Figure 2B:
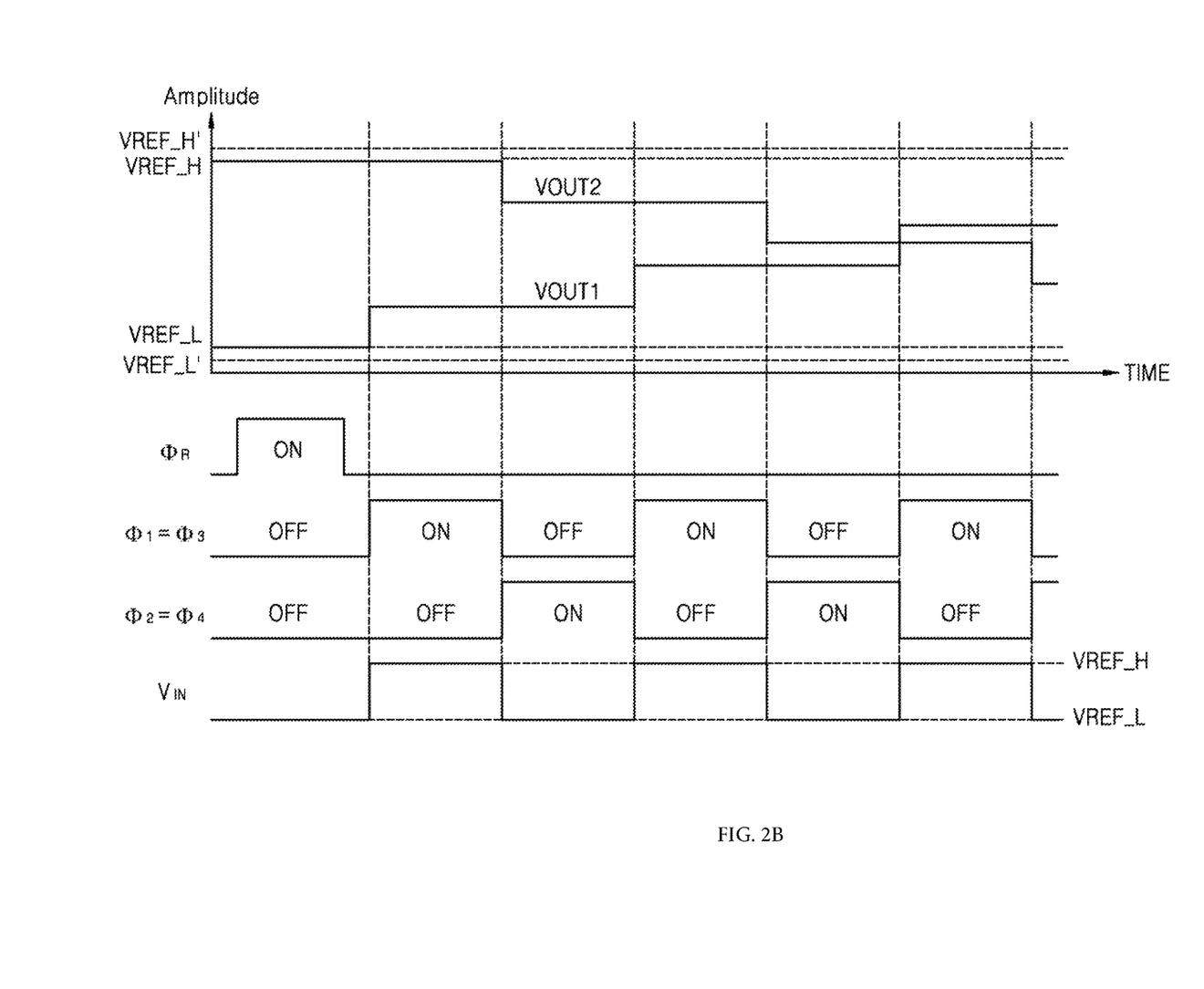
FIG. 2B is an operation timing diagram of each switch of the structure in FIG. 2A and represents a corresponding variation in output value.

FIG. 2B is a timing diagram that represents the operation method of the touch input detector 110 in FIG. 2A. In FIG. 2B, the horizontal axis represents time.

A signal $\Phi_R$ is a signal controlling the on/off state of the switches 71 to 74 and 81 and is a kind of a reset signal.

A signal $\Phi_1$ is a signal controlling the on/off state of the switch 61.

A signal $\Phi_2$ is a signal controlling the on/off state of the switch 62.

When the signals $\Phi_1$, $\Phi_2$, and $\Phi_R$ have high values, corresponding switches have on-states and when they have low values, corresponding switches have off-states.

A circuit part that includes two switches 61 and 62 may be defined as a detection-switch part (first switch part) 410 that adjusts the direction of currents flowing through the input of the touch input detector 110. In accordance with the operation of the first switch part 410, currents may enter or exit through the input of the touch input detector 110.

A signal $V_{IN}$ represents time vs. voltage of the input terminal IN and it may be understood by means of a configuration of the circuit in FIG. 2A that the amplitude (e.g., VREF_H) of the signal $V_{IN}$ when the signal $\Phi_1$ has the high value is larger than the amplitude (e.g., VREF_L) of the signal $V_{IN}$ when the signal $\Phi_2$ has the high value.

The amplitude of a voltage at the first output terminal VOUT1 becomes the second reference voltage VREF_when being reset by the switches 71 to 74 and 81. Then, it rises to a certain extent each time the signal $\Phi_1$ has a rising edge. Ideally, the rising extent may be determined by the relative ratio of the size of the capacitor $C_{SELF}$ and the size of the first integrator capacitor $C_{S1}$. The reason is that all currents $I_{CSELF}$ flowing through the capacitor $C_{SELF}$ in a transient section according to the rising edge of the signal $\Phi_1$ in the circuit structure in FIG. 2A flow through the first integrator capacitor $C_{S1}$.

The amplitude of a voltage at the second output terminal VOUT2 becomes the first reference voltage VREF_H when being reset by the switches 71 to 74 and 81. Then, it falls to a certain extent each time the signal $\Phi_2$ has a rising edge. Ideally, the falling extent may be determined by the relative ratio of the size of the capacitor $C_{SELF}$ and the size of the second integrator capacitor $C_{S2}$. The reason is that all currents $I_{CSELF}$ flowing through the capacitor $C_{SELF}$ in a transient section according to the rising edge of the signal $\Phi_2$ in the circuit structure in FIG. 2A flow through the second integrator capacitor $C_{S2}$.

When the touch input detector in the touch-chip 10 may be actually modeled equally to the touch input detector 110 in FIG. 2A, it is possible to ensure the same circuit operation as the design intention of the touch input detector 110. However, since only the capacitance $C_{SELF}$ is not formed at the touch detection electrode 101 in FIG. 2A and 'other capacitances' may be actually formed, there is a limitation in that a different circuit operation from the design intention may occur. In the following, the reason why other capacitances are generated is described through FIGS. 3A and 3B.

Figure 3A:
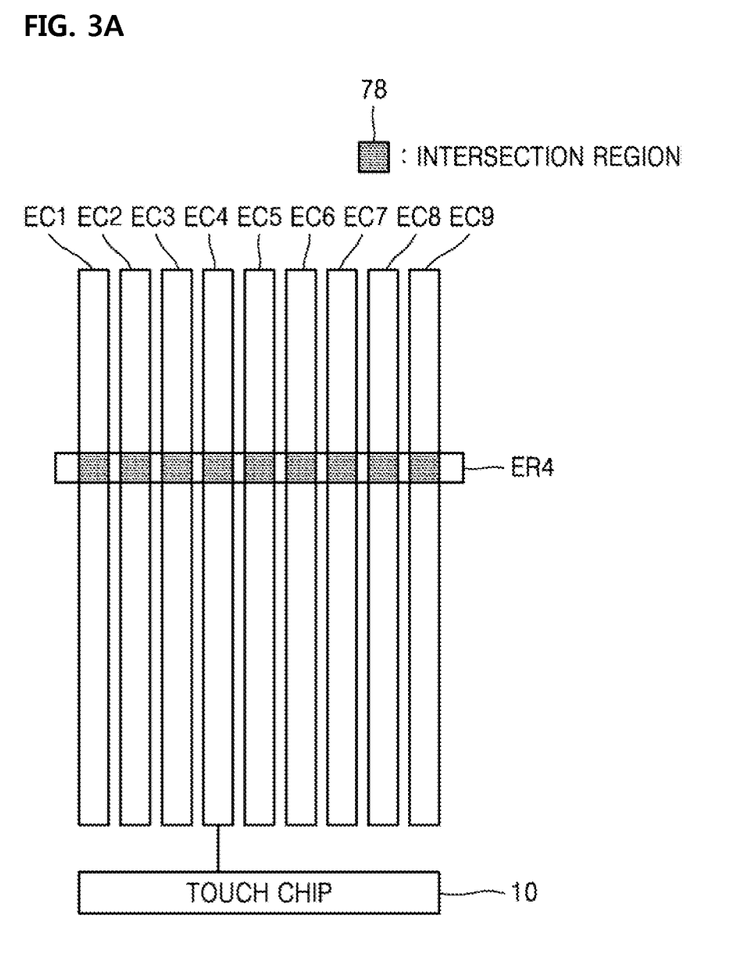
FIG. 3A is a diagram for explaining why mutual capacitance is formed between the electrodes that have the arrangement in FIG. 1.

FIG. 3A represents when sensing whether there is a variation in capacitance of the electrode ER4 in the touch input device 100 in FIG. 1 and represents the mutual arrangement of the electrode ER4 and the electrodes EC1 to EC9 for the convenience of description. In this case, the electrode ER4 has intersection regions where it intersects with the electrodes EC1 to EC9. By means of the intersection regions 78, mutual capacitances may be formed between the electrode ER4 and the electrodes EC1 to EC9, respectively. The mutual capacitances may provide a path through which currents flow. The mutual capacitances correspond to the 'other capacitances' as described above.

Figure 3B:
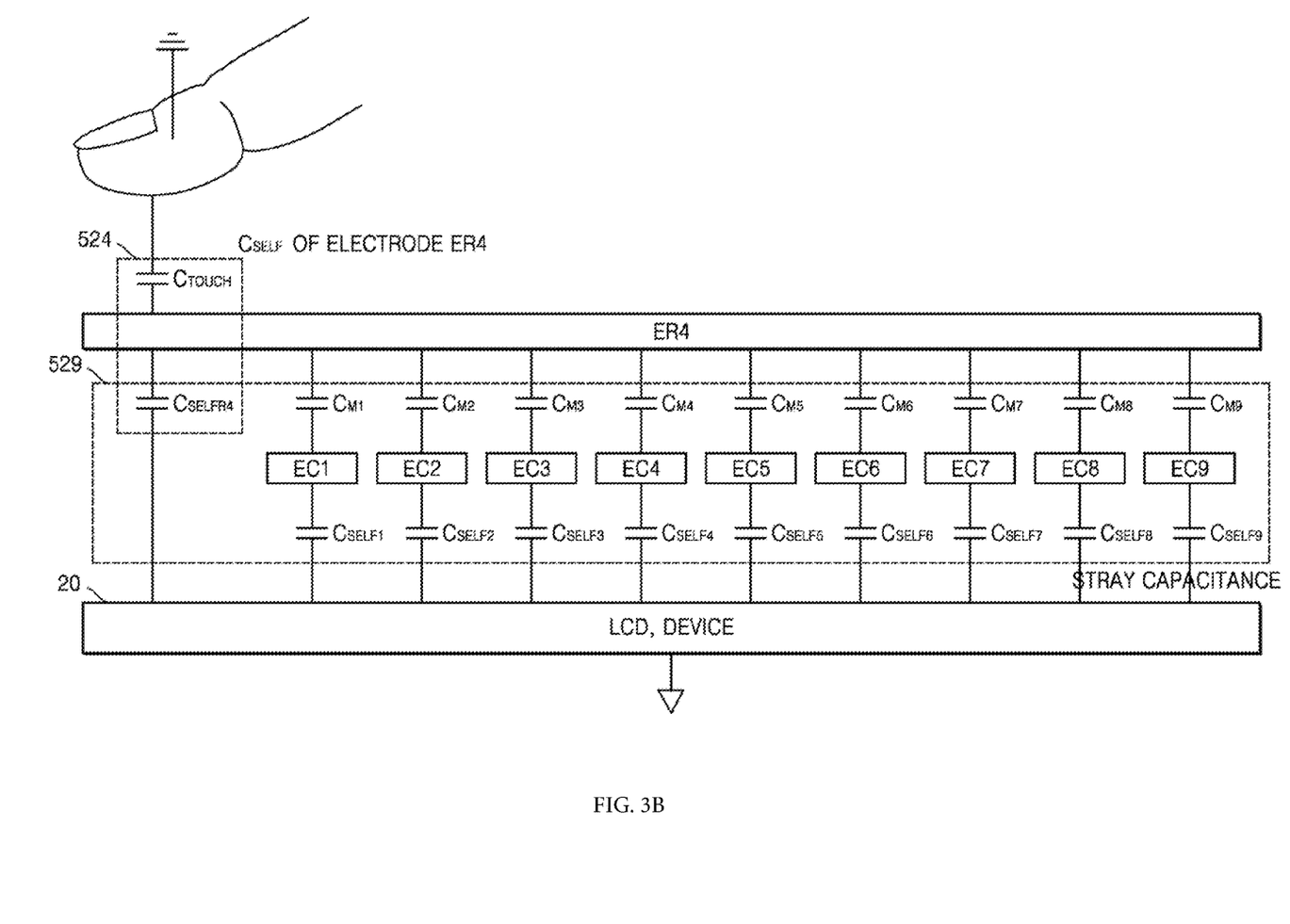
FIG. 3B is an example of modeling capacitive components formed around the electrode ER4 in FIG. 3A.

FIG. 3B represents an example of modeling capacitive components formed around the electrode ER4 in FIG. 3A.

A capacitance $C_{SELFR4}$ may be formed between the electrode ER4 and other devices 20, such as an LCD in a user device. In addition, when an object, such as a human being's finger approaches the electrode ER4, a sensing capacitance $C_{TOUCH}$ may be formed between the finger and the electrode ER4. In this example, a sum of the sensing capacitance $C_{TOUCH}$ and the capacitance $C_{SELFR4}$ may be referred to as a self capacitance $C_{SELF}$ 524 that is formed at the electrode ER4.

In addition, self capacitances $C_{SELF1}$ to $C_{SELF9}$ may be formed between the other devices 20 and the electrodes EC1 to EC9, respectively. In addition, mutual capacitances $C_{M1}$ to $C_{M9}$ may be formed between the electrode ER4 and the electrodes EC1 to EC9, respectively. In this case, the self capacitances $C_{SELF1}$ to $C_{SELF9}$, the mutual capacitances $C_{M1}$ to $C_{M9}$, and the capacitance $C_{SELFR4}$ may be defined as a stray capacitance 529 that are formed at the electrode ER4, a touch detection electrode.

Figure 4:
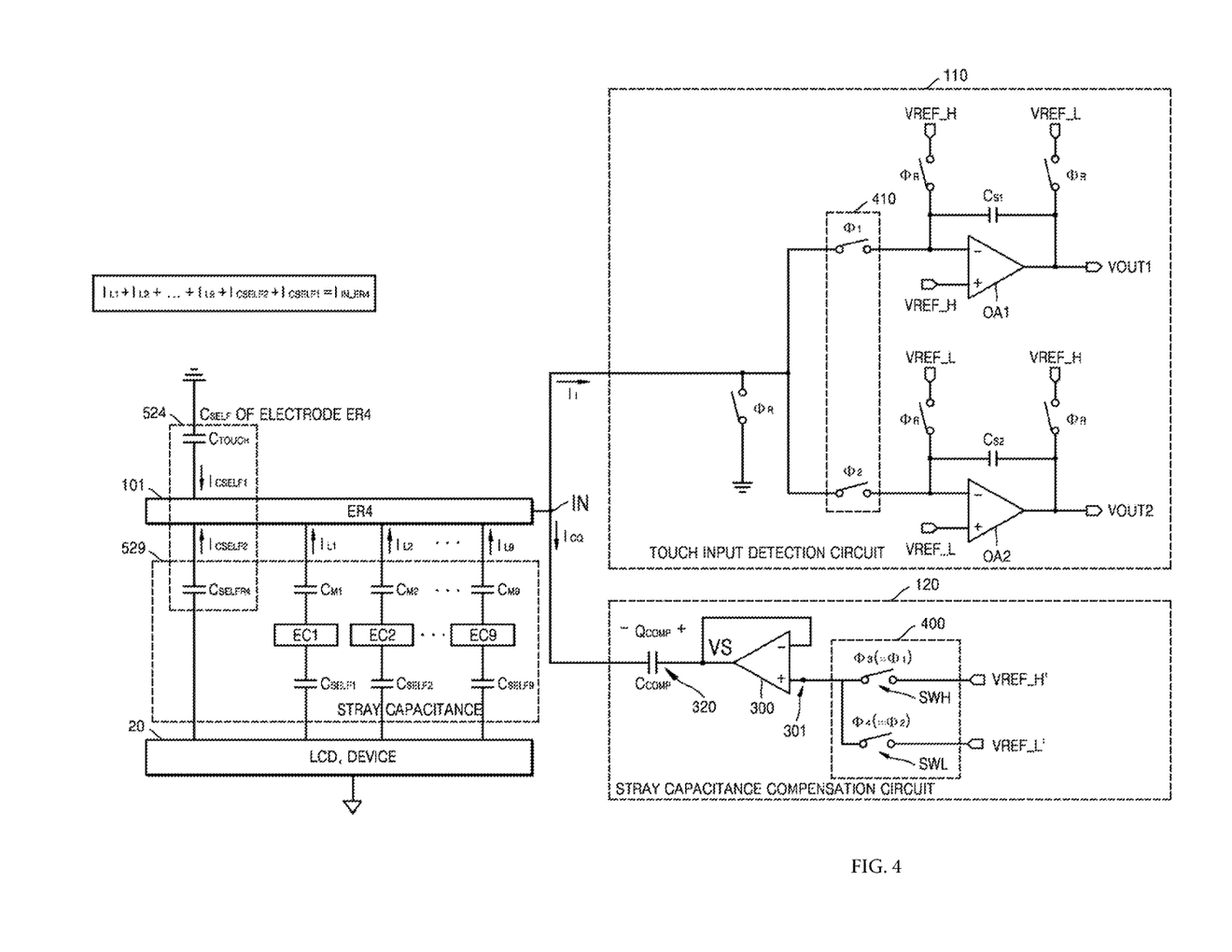
FIG. 4 represents an example of a compensator for decreasing the capacitance value of a touch input detection electrode viewed from the input of a touch input detector in accordance with an embodiment of the present disclosure.

FIG. 4 represents an example of a compensator for decreasing the capacitance value of a touch input detection electrode viewed from the input of a touch input detector in accordance with an embodiment of the present disclosure.

In the embodiment in FIG. 4, the touch input detection electrode is the electrode ER4. In this case, the capacitance value of the touch input detection electrode ER4 viewed from the input terminal IN of the touch input detector 110 may include the stray capacitance 529 and the sensing capacitance $C_{TOUCH}$. In this case, the sensing capacitance $C_{TOUCH}$ may be a value that varies according to whether there is a user touch input. In addition, the stray capacitance 529 may have a certain value, and when the electrical properties of other devices 20 vary according to the time, the value of the stray capacitance 529 may also vary regularly or irregularly according to the time.

FIG. 4 is different from FIG. 2A in the following three matters.

Firstly, the stray capacitance 529 formed around the electrode ER4 is modeled and displayed. The stray capacitance 529 may include the self capacitances $C_{SELF1}$ to $C_{SELF9}$, the mutual capacitances $C_{M1}$ to $C_{M9}$, and the capacitance $C_{SELFR4}$ as described in FIG. 3B.

Secondly, the self capacitance $C_{SELF}$ 524 formed at the electrode ER4 are divided into the sensing capacitance $C_{TOUCH}$ and the capacitance $C_{SELFR4}$.

Thirdly, in order to decrease the capacitance value of the touch input detection electrode ER connected to the input terminal IN of the touch input detector 110, a stray capacitance compensator 120 is added which is connected to the touch input detection electrode ER4 and to the input terminal IN of the touch input detector 110.

In FIG. 4, a current $I_{IN\_ER4}$ flowing into a touch input device by means of the capacitance component of the touch input detection electrode ER4 may include a current $I_{CSELF2}$ from the capacitance $C_{SELFR4}$, a current $I_{CSELF1}$ from the sensing capacitance $C_{TOUCH}$, and a current $I_L = I_{L1} + I_{L2} + \ldots + I_{L9}$ from the mutual capacitances $C_{M1}$ to $C_{M9}$. In addition, the current flowing into the touch input device from the detection electrode may include a current $I_I$ flowing into the touch input detector 110 and a current $I_{CQ}$ flowing into the stray capacitance compensator 120.

The stray capacitance compensator 120 is a circuit that enables the currents $I_I$ and $I_{CQ}$ to have the same sign. Thus, when the current $I_{IN\_ER4}$ has a positive value, all the currents $I_I$ and $I_{CQ}$ may have positive values, and when the current $I_{IN\_ER4}$ has a negative value, all the currents $I_I$ and $I_{CQ}$ may have negative values. That is, some of currents to be input/output to the touch input detector 110 may be input/output to the stray capacitance compensator 120. As a result, the amount of currents input/output to the touch input detector 110 decreases, so the capacitance value of the touch input detection electrode ER4 viewed from the input terminal IN of the touch input detector 110 decreases. In the case of the above circuit structure, when a touch input is applied to the touch input detection electrode ER4 and thus the value of the sensing capacitance CTOUCH is not zero, it is possible to sense a change in sensing capacitance $C_{TOUCH}$ more sensitively.

The stray capacitance compensator 120 is a circuit that enables the currents $I_I$ and $I_{CQ}$ to have the same sign. Thus, when the current $I_{IN\_ER4}$ has a positive value, all the currents $I_I$ and $I_{CQ}$ may have positive values, and when the current $I_{IN\_ER4}$ has a negative value, all the currents $I_I$ and $I_{CQ}$ may have negative values. That is, some of currents to be input/output to the touch input detector 110 may be input/output to the stray capacitance compensator 120. As a result, the amount of currents input/output to the touch input detector 110 decreases, so the capacitance value of the touch input detection electrode ER4 viewed from the input terminal IN of the touch input detector 110 decreases. In the case of the above circuit structure, when a touch input is applied to the touch input detection electrode ER4 and thus the value of the sensing capacitance $C_{TOUCH}$ is not zero, it is possible to a change in sensing capacitance $C_{TOUCH}$ more sensitively.

In a first embodiment, the first compensation voltage VRH may be the same as e.g., the first reference voltage VREF_H, and the second compensation voltage VRL may be the same as e.g., the second reference voltage VREF_. Alternatively, in a second embodiment, the first compensation voltage VRH may have a voltage VREF_H' higher than the first reference voltage VREF_H, and the second compensation voltage VRL may have a voltage VREF_L' lower than the second reference voltage VREF_(where VREF_H>VREF_L). FIG. 4 shows the second embodiment according to the latter case.

In the circuit in FIG. 4, since the above-described detection-switch part 410 and compensation-switch part 400 operate in synchronization with each other, the directions (i.e., signs) of the current Ii input to the touch input detector 110 and the current $I_{CQ}$ input to the stray capacitance compensator 120 are the same.

The first switch SWH and the second switch SWL of the switch part 400 do not simultaneously have on-states. For example, a first control signal $\Phi_3$ controlling the on/off of the first switch SWH may have the same pattern as the signal $\Phi_1$ in FIG. 2B, and a second control signal $\Phi_4$ controlling the on/off of the second switch WL may have the same pattern as the signal $\Phi_2$ in FIG. 2B.

Although FIG. 4 represents a configuration when the touch input detection electrode ER4 is connected to the stray capacitance compensator 120, the touch input detection electrode ER4 may be replaced with other touch input detection electrodes at other times. Although it is possible to use a circuit device, such as s switch or mux for the circuit change, the circuit device is omitted in FIG. 4.

Although FIG. 4 provides an example of when a variation in capacitance of the touch input detection electrode ER4 is measured, it may be easily understood that even when variations in capacitances of other electrodes are measured, it is also possible to have a similar circuit configuration as FIG. 4. For example, when a variation in capacitance of any one of the electrodes ER1 to ER3 and ER5 to ER10 is measured, it is possible to change only the electrode ER4 in FIG. 4 to a corresponding electrode. Also, when a variation in capacitance of any one of e.g., the electrodes EC1 to EC9 is measured, it is possible to change only the electrode ER4 in FIG. 4 to a corresponding electrode and change the electrodes EC1 to EC9 in FIG. 4 to the electrodes ER1 to ER10.

Figure 5:
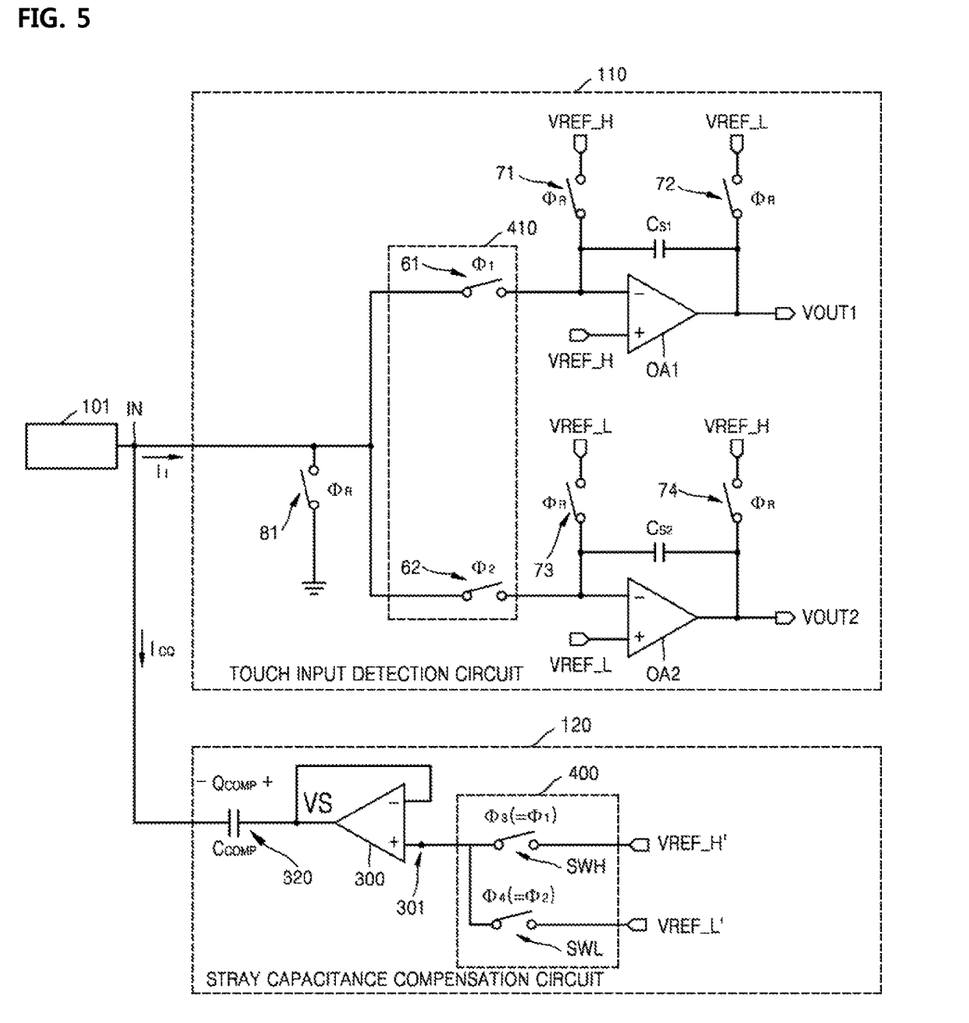
FIG. 5 represents the circuit configuration of a touch input device in accordance with another embodiment of the present disclosure.

FIG. 5 represents the circuit configuration of a touch input device in accordance with another embodiment of the present disclosure. The touch input device according to an embodiment of the present disclosure may include the touch input detector 110, the stray capacitance compensator 120, and the touch input detection electrode 101. The input terminal of the touch input detector 110 and the output terminal of the stray capacitance compensator 120 may be together connected to the touch input detection electrode 101. In this case, the touch input detector 110 may include the first switch part 410 that adjusts the sign of the current $I_I$ input to the input terminal of the touch input detector 110. In addition, the stray capacitance compensator 120 may include the second switch part 400 that operates in synchronization with the first switch part 410. Since the second switch part 400 is synchronized with the first switch part 410, it may adjust so that the signs of the current $I_I$ input to the input terminal of the touch input detector 110 and the current $I_{CQ}$ input to the output terminal of the stray capacitance compensator 120 are synchronized according to the time. In this example, the fact that the currents $I_I$ and $I_{CQ}$ are synchronized according to the time may mean that the sign of the current $I_{CQ}$ varies when the signal of the current $I_I$ varies.

In the first embodiment in accordance with the present disclosure, the signs of the currents $I_I$ and $I_{CQ}$ may be the same at a specific time.

Figure 6:
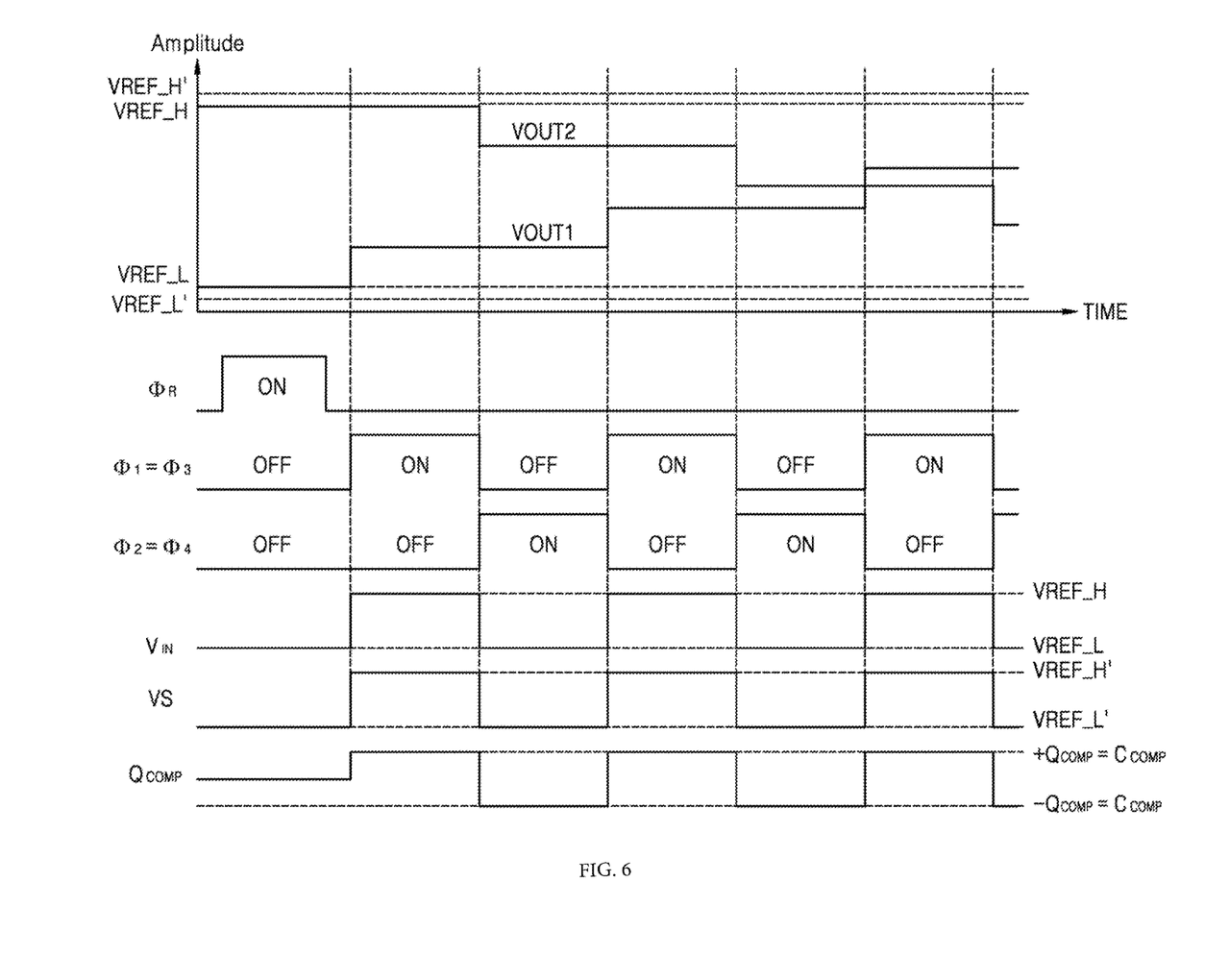
FIG. 6 is a timing diagram for explaining time vs. operational characteristics of a stray capacitance compensator provided in accordance with an embodiment of the present disclosure.

FIG. 6 is a timing diagram for explaining time vs. operational characteristics of a stray capacitance compensator provided in accordance with the first embodiment of the present disclosure.

In FIG. 6, a voltage VS at the output terminal of the operational amplifier 300 may be designed to follow time vs. variation pattern of a signal $V_{IN}$. In addition, in the embodiment in FIG. 6, the amount and the patterns of the signs of charges $Q_{comp}$ accumulated in the compensation capacitor $C_{comp}$ may follow a pattern that the voltage VS represents.

Referring to FIGS. 4 and 6 together, in order to implement the first embodiment, the first compensation voltage VRH may have a voltage VREF_H' higher than the first reference voltage VREF_H, and the second compensation voltage VRL may have a voltage VREF_L' lower than the second reference voltage VREF_(where VREF_H>VREF_L).

Alternatively, in the second embodiment in accordance with the present disclosure, the signs of the currents $I_f$ and $I_{CQ}$ may be different from each other at a specific time. In order to implement the second embodiment, the first compensation voltage VRH in FIG. 6 may be changed to a voltage VREF_H" lower than the first reference voltage VREF_H and the second compensation voltage VRL may be changed to a voltage VREF_L" higher than the second reference voltage VREF_(where VREF_H>VREF_L).

While the first embodiment has an effect of decreasing the capacitance value of the touch input detection electrode viewed from the input of the touch input detector, the second embodiment has an effect of increasing the capacitance value of the touch input detection electrode viewed from the input of the touch input detector. Thus, the first embodiment has an effect of increasing the sensitivity of the touch input detector and the second embodiment has an effect of decreasing the sensitivity of the touch input detector. Although the first embodiment is mostly described in FIGS. 1 to 4, it may be understood that the spirit of the present disclosure includes a configuration and effect in accordance with the second embodiment.

In the following, the touch chip in accordance with an embodiment of the present disclosure is described with reference to FIGS. 4 to 6. The touch chip may include the touch input detector 110 and the compensator 120. In this case, an input terminal IN of the touch input detector and an output terminal of the compensator are together connected to the touch input sensing electrode 101, and the direction change of a first current $I_f$ flowing through the input terminal of the touch input detector and the direction change of a second current $I_{CQ}$ flowing through the output terminal of the compensator are performed through synchronization.

In this case, the sign of the first current and the sign of the second current may be the same each other. Alternatively, the sign of the first current and the sign of the second current may be different from each other.

In this case, the compensator may include the compensation capacitor 320; the operational amplifier 300; and the compensation-switch part 400 that is connected to selectively provide the input terminal of the operational amplifier with two different input voltages. In addition, one terminal of the compensation capacitor may be connected to the touch input sensing electrode 101 and the other terminal of the compensation capacitor may be connected to the output terminal VS of the operational amplifier.

In this case, the touch input detector 110 may include the first operational amplifier OA1 and the second operational amplifier OA2, a first predetermined reference voltage VREF_H may be applied to the non-inverting input terminal of the first operational amplifier, a second predetermined reference voltage VREF_may be applied to the non-inverting input terminal of the second operational amplifier, and the touch input sensing electrode 101 may be selectively connected to the inverting input terminal of the first operational amplifier and to the inverting input terminal of the second operational amplifier through the detection-switch part 410.

In this case, a voltage of the one terminal of the compensation capacitor may be controlled by the touch input detector 110, a voltage of the other terminal of the compensation capacitor may be controlled by the voltage VS of the output terminal of the operational amplifier 300, the operations of the compensation-switch part and the detection-switch part may be synchronized each other, and a variation in polarity of a voltage across the compensation capacitor may be synchronized with the operations of the compensation-switch part and the detection-switch part.

In this case, the first operational amplifier and the second operational amplifier may include integrator capacitors $C_{S1}$ and $C_{S2}$, respectively that integrate currents flowing through the input terminal of the touch input detector, and an output signal from the touch input detector may be provided as a voltage difference between the first output terminal VOUT of the first operational amplifier and the second output terminal VOUT2 of the second operational amplifier.

In the following, the touch input device in accordance with an embodiment of the present disclosure is described with reference to FIG. 4. The touch input device may include the touch input sensing electrode 101; one or more second electrodes EC1 to EC9 that form mutual capacitances $C_{M1}$ to $C_{M9}$ with the touch input sensing electrode; and the compensator 120, the input terminal of the touch input detector and the output terminal of the compensator may be together connected to the touch input sensing electrode, and the direction change of the second current flowing through the output terminal of the compensator and the direction change of the first current flowing through the input terminal of the touch input detector may be synchronized each other.

The present disclosure may be applied to both a structure in which the touch input sensing electrodes are arranged in a single layer and a structure in which they are arranged in a plurality of layers. Also, it may be applied to both a mutual capacitance method and a self capacitance type.

Although the specification provides an example where a plurality of electrodes are arranged in two layers, the present disclosure may also be applied to when all electrodes are arranged in a single layer, like a pattern published through Korean Patent Publication No. 10-2014-0044720.

According to the present disclosure, it is possible to provide a technology to make smaller the equivalent value of a capacitance formed at the touch input detection electrode viewed from the input of the touch input detector. When as a result, a touch input is applied to the touch input detection electrode, it is possible to sense a variation in capacitance formed at the touch input detection electrode more sensitively.

According to the present disclosure, it is possible to provide a technology to make larger the equivalent value of a capacitance formed at the touch input detection electrode viewed from the input of the touch input detector. When as a result, a touch input is applied to the touch input detection electrode, it is possible to decrease sensitivity to a variation in capacitance formed at the touch input detection electrode.

A person skilled in the art to which the present disclosure pertains may easily implement various variations and modifications without departing from the essential characteristic of the present disclosure, by using the above-described embodiments of the present disclosure. The details of each claim in the following claims may be combined with other claims not dependent thereon as long as it is possible to understand through the specification.

What is claimed is:

1. A touch chip comprising:
    a touch input detector and a compensator,
    wherein an input terminal of the touch input detector and an output terminal of the compensator are together connected to a touch input sensing electrode, the compensator comprises a compensation capacitor; an operational amplifier; and a compensation-switch part that is connected to selectively provide an input terminal of the operational amplifier with two different input voltages, one terminal of the compensation capacitor is connected to the touch input sensing electrode and another terminal of the compensation capacitor is connected to an output terminal of the operational amplifier, the touch input detector comprises a first operational amplifier and a second operational amplifier, the touch input sensing electrode is selectively connected to an inverting input terminal of the first operational amplifier and to an inverting input terminal of the second operational amplifier through a detection-switch part, a voltage of the one terminal of the compensation capacitor is controlled by the touch input detector, and a voltage of the other terminal of the compensation capacitor is controlled by a voltage of the output terminal of the operational amplifier, operations of the compensation-switch part and the detection-switch part are synchronized with each other, a variation in polarity of a voltage across the compensation capacitor is synchronized with the operations of the compensation-switch part and the detection-switch part, and a direction change of a first current flowing through the input terminal of the touch input detector and a direction change of a second current flowing through the output terminal of the compensator are performed through synchronization.

2. The touch chip of claim 1, wherein a sign of the first current and a sign of the second current are the same.

3. The touch chip of claim 1, wherein a sign of the first current and a sign of the second current are different from each other.

4. The touch chip of claim 1, wherein
a first predetermined reference voltage is applied to a non-inverting input terminal of the first operational amplifier, and a second predetermined reference voltage is applied to a non-inverting input terminal of the second operational amplifier.

5. The touch chip of claim 4, wherein the first operational amplifier and the second operational amplifier comprise integrator capacitors, respectively that integrate currents flowing through the input terminal of the touch input detector, and an output signal from the touch input detector is provided as a voltage difference between a first output terminal of the first operational amplifier and a second output terminal of the second operational amplifier.

6. A touch input device comprising:
a touch input sensing electrode; one or more second electrodes forming mutual capacitance with the touch input sensing electrode; a touch input detector; and a compensator, wherein an input terminal of the touch input detector and an output terminal of the compensator are together connected to the touch input sensing electrode, the compensator comprises a compensation capacitor; an operational amplifier; and a compensation-switch part that is connected to selectively provide an input terminal of the operational amplifier with two different input voltages, one terminal of the compensation capacitor is connected to the touch input sensing electrode and another terminal of the compensation capacitor is connected to an output terminal of the operational amplifier, the touch input detector comprises a first operational amplifier and a second operational amplifier, the touch input sensing electrode is selectively connected to an inverting input terminal of the first operational amplifier and to an inverting input terminal of the second operational amplifier through a detection-switch part, a voltage of the one terminal of the compensation capacitor is controlled by the touch input detector, and a voltage of the other terminal of the compensation capacitor is controlled by a voltage of the output terminal of the operational amplifier, operations of the compensation-switch part and the detection-switch part are synchronized with each other, a variation in polarity of a voltage across the compensation capacitor is synchronized with the operations of the compensation-switch part and the detection-switch part, and a direction change of a first current flowing through the input terminal of the touch input detector and a direction change of a second current flowing through the output terminal of the compensator are performed through synchronization.

7. The touch input device of claim 6, wherein
a direction change time of the first current, a state variation time of the detection-switch part, a direction change time of the second current, and a state variation time of the compensation-switch part are synchronized with one another.

* * * * *